United States Patent
Ando et al.

(10) Patent No.: US 6,777,463 B2
(45) Date of Patent: Aug. 17, 2004

(54) PARTICLES CONTAINING A COLORANT AND A WATER-BASED INK COMPRISING POLYMER EMULSION

(75) Inventors: Hiroaki Ando, Tokyo (JP); Hidetaka Ninomiya, Tokyo (JP); Shinzo Omi, Tokyo (JP)

(73) Assignee: Konica Corporation, Tokyo (JP)

( * ) Notice: Subject to any disclaimer, the term of this patent is extended or adjusted under 35 U.S.C. 154(b) by 114 days.

(21) Appl. No.: 10/135,311

(22) Filed: Apr. 29, 2002

(65) Prior Publication Data

US 2003/0008939 A1 Jan. 9, 2003

(30) Foreign Application Priority Data

May 16, 2001 (JP) .......................... 2001-146067

(51) Int. Cl.⁷ .................... C09D 11/10; C08L 59/00; C08L 29/04; C08L 25/08; C08L 33/14
(52) U.S. Cl. ........................ 523/160; 523/201
(58) Field of Search ............... 523/160, 161, 523/201; 524/504

(56) References Cited

U.S. PATENT DOCUMENTS

| | | | | |
|---|---|---|---|---|
| 4,187,194 A | * | 2/1980 | Wellman et al. ............ 252/316 |
| 4,837,107 A | * | 6/1989 | Axelsson et al. ............ 430/138 |
| 5,407,770 A | * | 4/1995 | Tomita et al. ............ 430/106.6 |
| 6,013,404 A | * | 1/2000 | Feng et al. ............ 430/106.6 |
| 2003/0021983 A1 | * | 1/2003 | Nohr et al. ............ 428/327 |

FOREIGN PATENT DOCUMENTS

| | | |
|---|---|---|
| EP | 0 458 082 | 11/1991 |
| EP | 0 952 495 | 10/1999 |
| EP | 1 002 810 | 5/2000 |
| EP | 1 091 258 | 4/2001 |
| EP | 1 264 867 | 12/2002 |

* cited by examiner

Primary Examiner—Callie Shosho
(74) Attorney, Agent, or Firm—Squire, Sanders & Dempsey L.L.P.

(57) ABSTRACT

A polymer dispersion comprising water and polymer particles having a size of 5 to 500 nm in volume average diameter and having a core-part and a shell-part in each of the polymer particles, wherein the core-part and the shell-part each comprise a colorant and a polymer, and the shell-part contains the colorant in an amount of not more than 80 weight % of the colorant in the core-part.

4 Claims, No Drawings

PARTICLES CONTAINING A COLORANT AND A WATER-BASED INK COMPRISING POLYMER EMULSION

FIELD OF THE INVENTION

The present invention relates to a core-shell type colorant-including fine particle and a polymer emulsion type water-based ink by use thereof having superior color reproduction quality and fastness.

BACKGROUND OF THE INVENTION

In recent years, elimination of solvents or water-based constitution has been demanded with respect to recording materials and an inking material utilized for printers, printing machines, markers, writing tools, etc. Especially as water-based recording materials utilized for an ink-jet system, those comprising mainly an aqueous solution of a water-soluble dye and those comprising mainly a fine dispersion of a pigment having been commonly used.

<Recording Material Using Water-Soluble Dyes>

In a recording material comprising water-soluble dyes, there is used an aqueous solution of water-soluble dyes which are categorized mainly into acid dyes, direct dyes and a part of food dyes, being added thereto glycols or alkanolamines as a wetting agent, surfactants or alcohols in order to adjust the surface tension, resins as a binder component and the like. The recording materials using water-soluble dyes are most commonly used because of the high reliability of anti-clogging at a pen top or in a recording system. The recording materials using water-soluble dyes are, however, easy to cause blotting on recording paper because they comprise an aqueous solution of dyes. Further, print quality is forced to deteriorate due to blotting of the ink which has been adjusted so as to quickly permeate into recording paper for accelerating the apparent drying speed. Water resistance is naturally poor due to the nature of water-soluble dyes. In addition, light fastness is very poor because water-soluble dyes only permeate into the recording material and they are dried to adhere in the recording paper. They are hardly said being dyed.

Heretofore, recent years, several techniques such as a technique disclosed in JP-A 2000-281947 (the term, JP-A refers to an unexamined and published Japanese Patent Application), in which dyeing ability is enhanced by utilizing an interaction between a dye and a polymer in a two-solution system with cationic polymers to prevent blotting and enhance fastness, have been tried, but it is hard to say that light fastness has been improved while keeping color reproduction quality of water-soluble dyes.

As a mean to overcome the aforementioned problems of recording materials using water-soluble dyes, addition of resin fine particles such as emulsions, latexes and the like has been studied for years. There proposed a recording material for ink-jet recording in JP-A 55-18418, in which a latex, "a kind of colloidal solution comprising fine particles (having a particle diameter of approximately from 0.01 to a few $\mu$m) of components such as rubbers and resins dispersed in water by use of emulsifiers" is added. As latexes preferably used, listed are synthetic rubber latexes such as a styrene-butadiene copolymer latex, an acrylonitrile-butadiene copolymer latex, a polychloroprene latex, a vinylpyridine-styrene-butadiene latex, a butyl rubber latex, a polybutadiene latex, a polyisoprene latex and a polysulfide rubber latex; or synthetic resin type latexes such as an acryl ester type latex, a styrene-butadiene resin latex, a vinyl acetate type latex, a vinyl chloride type latex and a vinylidene chloride type latex.

Synthetic rubber type latexes listed in the above patent proposal, whose specific gravity is approximately within a range of from 0.9 to 1.0, satisfy such conditions to some extent, but there are problems in terms of light fastness and weather-proofing because most synthetic rubbers have unsaturated double bonds in the molecule. On the other hand, when the number of the unsaturated bonds is decreased by vulcanization, there occurs a problem of recording quality due to retardation of fixing of particles on recording paper. Further, excessive vulcanization causes a problem of precipitation because the specific gravity becomes not less than 1.1. In addition, the synthetic rubber type latexes have a low glass transition temperature to easily form film at room temperature, which causes ink-jet nozzles to be often clogged when the ink is dried at the top portion of the nozzles, and furthermore, the property of the dried substance being soft and slightly sticky making it very hard to be removed. The synthetic resin latexes listed in the patent all causes precipitation in a particle diameter range of exhibiting anti-blotting effect because the specific gravity reaches to over 1.1 and especially with the synthetic resin containing halogens it reaches to nearly 1.3 to 1.5.

Further, it can be said generally for these latexes that most of emulsifiers used for preparing the latexes tend to accelerate foaming of an ink and cause many problems due to unnecessary decrease of surface tension. In JP-A 54-146109 is proposed a recording material utilizing a water-soluble dye to which vinyl polymer fine particles having been swelled with solvents and dyed with oil dyes are added. There are listed mainly (metha)acrylic acid ester type copolymer fine particles as polymers suitably utilized and also there is described that a glass transition temperature of not higher than 30° C. is a preferable condition. It is self-evident that fine particles having such a low glass transition temperature and having been swelled with solvents show film-forming property when they are dried at room temperature, and it can be easily analogized that utilizing such an ink will cause nozzle clogging frequently. There is a proposal of an image recording ink, in JP-A 3-56573, which contains dyes or pigments and 5 to 40 weight % of organic ultra-fine particles having an average particle diameter of not more than 0.5 $\mu$m and being internally three-dimensionally cross linked. However, because such ultra-fine fine particles cannot be fixed on recording paper, it results in deteriorated durability of recorded images.

<Recording Material Using a Pigment Dispersion>

In order to overcome the weak point of recording materials comprising water-soluble dyes, there is proposed a recording material comprising carbon black or an organic pigment. In such recording materials comprising a dispersion of pigments, water-resistance of an ink is markedly improved. The specific gravity of these pigments is, however, as high as 1.5 to 2.0, and caution is required in respect with precipitation of dispersed particles. To disperse pigments having such a high specific gravity stably, it is necessary to finely disperse so as to make an average particle diameter down to approximately 0.1 $\mu$m, which makes the cost of dispersion very high resulting in to produce an expensive ink.

<Recording Material Using Colored Resin Particles>

A proposal of dyeing water-dispersible resins by an oil-soluble (oleophilic or hydrophobic) dye is presented as an ink-jet ink. This is a proposal on "an ink using colored polymer fine particles as a recording material". For example, in JP-A 54-58504, an ink in which a mixture of a hydrophobic dye solution and vinyl polymer fine particles is dispersed as an oil-in-water type is proposed. It is disclosed that vinyl polymer fine particles being mixed with hydrophobic dye solution are swelled by solvents of a dye solution and colored with a dye. It is also described that because of utilizing hydrophobic recording material, obtained images result in of water-resistant. In the proposal, by utilizing water as a continuous phase and colored vinyl polymer particles swelled with solvents as a dispersed phase, the control of ink viscosity is subjected to water allowing solvents having relatively a high viscosity (low volatile) to be used.

In JP-A 55-139471 and 3-250069, there is proposed an ink using emulsion polymerization or dispersion polymerization particles colored with dyes. The point of the proposal is to prevent blotting by use of colored particles as a dispersed phase and water as a dispersion medium, which is similar to that of JP-A 54-58504, but it is necessary to fix onto recording paper by film-formation of the particles because solvent is not included in the case of this proposal. Preferable particle diameter is suggested to be in a range of sub-micron, in terms of necessity of film-formation and secure of dispersion stability. In JP-A 54-58504, it is allowed to enhance dyeing ability by swelling of polymer fine particles with solvents, but, in this case, a problem of nozzle clogging occurs due to film formation by drying at the top portion of nozzles.

Further, in such recording materials comprising colored fine particles, the polymer composition has been mainly adjusted to enhance the stability thereof in an ink, but it has been very difficult for colored fine particles to achieve homogeneous incorporation of a colorant and stability at the same time.

As described above, a fine particle dispersion type recording material utilizing pigments, colored resins, conceal possibility of overcoming problems accompanied with a water-soluble dye type recording material and of achieving excellent recording quality, but still various kinds of problems are remained, and especially a conflicting problem, in which using dyes with superior color reproduction quality results in insufficient fastness while using pigments with excellent fastness results in poor color reproduction quality, has not been solved. Accordingly, the object of the present invention is to provide a water-based ink, which comprises core-shell type colorant including fine particles, having enhanced fastness and superior color reproduction quality.

The foregoing objects of the present invention can be accomplished by using a water-based ink, comprising a suspension of fine particles which comprise a polymer core containing a colorant and a polymer shell having a colorant content less than that of a core, and having a specific range of a particle diameter and a specific variation coefficient of a particle diameter, as described below.

(1) A polymer dispersion comprising water and polymer particles having a size of 5 to 500 nm in volume average diameter (or 50% volume particle diameter) and having a core-part and a shell-part in each of the polymer particles, wherein the core-part and the shell-part each comprise a colorant and a polymer, and the shell-part contains the colorant in an amount of not more than 80 weight % of the colorant in the core-part.

(2) The polymer particles of item (1), wherein the core-part and the shell-part each comprise a colorant and a polymer, and the shell-part contains the colorant in an amount of not more than 50 weight % of the colorant in the core-part.

(3) The polymer particles of item (1), wherein the variation coefficient of the volume diameter of the polymer particles is not more than 80%.

(4) The polymer particles of item (1), wherein the shell-part in each of the polymer particles contains the polymer in an amount of 5 to 95 weight % of the polymer in each of the polymer particles.

(5) The polymer particles of item (1), wherein each of the polymer particles contains the colorant in an amount of 20 to 1000 weight % of the polymer in each of the polymer particles.

(6) A water-base ink for ink-jet printing comprising the polymer dispersion of item (1).

DETAILED DESCRIPTION OF THE INVENTION

The invention will be detailed below.

In the present invention it is a specific characteristic that a colorant-containing polymer core and a polymer shell having a colorant content less than that of the core are provided. A polymer core mainly contains a colorant and contributes to maintain the fastness or color tone. On the other hand, a polymer shell contributes to increase stability of a colorant-containing fine particle as an ink suspension, as well as to accelerate fixing a colorant on a medium, to prevent coagulation and to improve image quality. In addition, it contributes fastness of a colorant and maintaining color tone.

In the present invention, a colorant content ratio (concentration) in a shell is not more than 0.8 of that in a core without core/shell formation, preferably not more than 0.5 and furthermore preferably not more than 0.2.

The colorant content (concentration) can be measured by a mass spectrometer such as TOF-SIMS. In TOF-SIMS, first measured is the total amount of ions having a mass number of from 1 to 1000 with respect to each fine particle surface, and a colorant content can be determined from the total amount of ions attributed to dyes. Each colorant content of a shell and of a core which is not converted into a core-shell form is compared. Since TOF-SIMS can perform elementary analysis in the depth direction of a few nm from the surface, it is possible to analyze such a core/shell type fine particle of the present invention.

In the present invention, since a colorant-containing fine particle used in a polymer emulsion type ink has a very large surface area per unite volume when the volume average particle diameter is not more than 5 nm, the effect of sealing a colorant in a core/shell polymer is decreased. On the other hand, a particle having a particle diameter of over 500 nm tends to clog in the head, as well as to precipitate in an ink and the storage stability of an ink is deteriorated. The particle diameter is preferably not less than 5 nm and not more than 400 nm, and more preferably not less than 10 nm and not more than 300 nm.

The volume average particle diameter is determined by spherical conversion of a circular equivalent particle diameter obtained from a value of projected areas (for at least 100 particles) in a transmission type electron micrograph (TEM). A volume average particle diameter and its standard deviation are thus determined and a variation coefficient is calculated by dividing the standard deviation by the volume average particle diameter.

An example of simple and convenient measuring methods for the variation coefficient of the volume diameter of the present invention is a photon correlation method. Examples of measuring apparatus are: Laser particle analyzing system manufactured by OTSUKA ELECTRONICS CO., LTD; and Zetasizer 1000HS/2000/3000HS manufactured by MALVERN Co., Ltd.

A variation coefficient of a particle diameter is a value of a standard deviation of a particle diameter divided by a particle diameter, and it is meant that the larger is this value the wider is the distribution of a particle diameter. When a variation coefficient of a volume particle diameter is not less than 80%, the distribution of particle diameter becomes very wide, so that the thickness of a core-shell tends to be inhomogeneous and the surface physical properties tend to vary with respect to each particle. The variation of the surface physical properties causes coagulation of particles easily which often results in clogging of an ink-jet head. Furthermore, coagulation of particles easily causes light scattering of a colorant on a medium resulting in deterioration of image quality. The variation coefficient is preferably not more than 50% and more preferably not more than 30%.

In the present invention, an amount of polymer used for a shell is not less than 5 weight % and not more than 95 weight % base on the total polymer amount. When it is not more than 5 weight % the thickness of a shell is not sufficient so that a part of a core containing a large amount of a colorant easily comes to appear out of the particle surface. Further, when the polymer in a shell is too much, it is easy to cause lowering of ability to protect the colorant in a core. It is more preferably not less than 10 weight % and not more than 90 weight %.

The total amount of a colorant is preferably not less than 20 weight % and not more than 1000 weight % base on the total polymer amount. When the amount of a colorant is too small compared to a polymer, the image density is not sufficiently high after being ink-jet recording, while when the amount of a colorant is too large, protecting ability of a polymer is not sufficient.

A core-shell according to the present invention may be prepared by a method in which a colorant containing polymer shell is provided after a polymer core is prepared, or by a method in which a core and a shell are simultaneously prepared.

<Case of Providing a Shell After Preparation of a Core of Fine Particles>

A colorant-containing polymer which is to constitute a core can be prepared by various methods. For example, following methods can be used: a method in which an oil dye is dissolved in a monomer, and after being emulsified in water the dye is sealed by polymerization; a method in which a polymer and a dye are dissolved in organic solvents, and after being dispersed in water the organic solvents are removed; and a method in which porous polymer fine particles are added to a dye solution and the dye is adsorbed and impregnated into the fine particles. As methods to prepare a polymer shell thereto, included are such a method in which a water-soluble polymer dispersant is added and adsorbed to a water-based suspension of a polymer which is to constitute a core, a method in which a monomer is gradually added dropwise and is polymerized to precipitate on a core surface, and a method in which a polymer dissolved in organic solvents is gradually added dropwise and precipitated to be adsorbed on a core surface.

Further, it is also possible that a pigment is mixed and pasted with a polymer, then being dispersed in a water phase to prepare a polymer-coated pigment core and a shell is provided by the foregoing method.

<Method to Prepare Simultaneously a Core and a Shell in Fine Particle Formation>

There are such a method in which after the polymerization of a polymer and a colorant which are to constitute a core, being dissolved or dispersed in a monomer which is to constitute a shell and suspension polymerization is performed in water, and a method in which emulsion polymerization is performed while the solution is gradually added dropwise into water containing surfactant micells. A monomer may constitute a core and a polymer may constitute a shell. Further, there is a method in which a colorant is dissolved or dispersed in a mixed solution of a monomer which is to constitute a core and a monomer which is to constitute a shell after the polymerization, and suspension polymerization or emulsion polymerization is performed.

<Evaluation of Core/Shell Formation>

It is important to evaluate whether a core-shell is actually formed or not. In the present invention, each particle diameter is as very small as being not more than 200 nm, the analytical methods are limited in terms of resolution. As analytical methods to achieve such an object, TEM or TO-SIMS is applicable. In case of observing core/shell fine particles by TEM, they can be observed by the dispersed solution being coated and dried on a carbon support film. Because the observed images of TEM have low contrast differences with only depending on the organic polymer kinds, it is necessary to dye the fine particles by use of such as osmium tetraoxide, ruthenium tetraoxide, chloro sulfonic acid/uranyl acetate and silver sulfide in order to evaluate core/shell formation. A fine particle comprised of only a core is dyed and TEM observation thereof is performed to be compared with that of a fine particle provided with a shell. Further, fine particles provided with a shell and those without a shell after being mixed are dyed, and confirmation is made whether the ratio of fine particles having different degrees of dyeing is identical to the ratio of the presence to the absence of a shell.

By a mass spectrometer such as TOF-SIMS, confirmation is made by the fact that an amount of a colorant neighboring to a surface is reduced by providing a shell on a particle surface compared to that in case of a core only. When an element, which is not contained in a polymer constituting a core/shell is present in a colorant, whether a shell having a less colorant content is provided or not can be confirmed by utilizing the element as a probe.

In other words, a colorant content ratio (concentration) can be obtained, by the use of TOF-SIMS, by firstly measuring the total amount of ions having a mass number of from 1 to 1000 with respect to each fine particle surface, and by determining the ratio, among them, of total amount of ions arising from elements which are contained in a dye but are not contained in a core-shell polymer. By the method, comparing each colorant content ratio of a shell to a core without core/shell formation, each colorant content ratio (concentration) can be measured. Since TOF-SIMS can perform elemental analysis in the depth direction of a few nm from a surface, it is possible to analyze such a core-shell fine particle of the present invention.

When there is not such an element, by using a suitable dyeing agent such as $RuO_4$, a colorant content in a shell can be compared with that of a particle without a shell.

Further, core-shell formation can be more clearly observed by burying a core-shell particle in epoxy resin, preparing an ultra-thin slice by a microtome and dyeing the slice. As described above, when there is an element which can be a probe in a polymer or colorant, the composition of a core/shell and the distribution of a colorant in a core and a shell also can be estimated.

In the present invention, as described above, a colorant content ratio (concentration) in a shell is not more than 0.8 of that in a core without core/shell formation. Preferably it is not more than 0.5 and more preferably not more than 0.2 (of course, it can be 0 or unlimitedly near to 0). Hereby, a polymer core, by including main portion of a colorant, contributes the fastness and maintenance of color tone, while a polymer shell contributes to enhance stability of the colorant-containing fine particles as an ink suspension as well as to accelerate fixing and to prevent coagulation of a colorant on a medium, to improve image quality, and fastness of a colorant and maintenance of a color tone.

It is important to optimize the recipe and to select a suitable emulsifying method in order to obtain a required particle diameter. The recipe varies depending on a colorant and a polymer used, it is necessary that a polymer constituting a shell is generally more hydrophilic than a polymer constituting a core. A colorant contained in a polymer constituting a shell is preferably less than that in a polymer constituting a core, and a colorant is necessary to be less hydrophilic than a polymer constituting a shell. Hydrophilicity and hydrophobicity, for example, can be estimated by using a solubility parameter (SP). The solubility parameters are referred to the description in POLYMER HANDBOOK, 4th edition (JOHN WILLY & SONS, INC.) pages from 675, in respect with the value, measurement and calculation.

However, shell formation is sometimes difficult when the SP value of a shell polymer is much larger than the SP value of a core polymer. Therefore, the SP value difference between a shell polymer and a core polymer is limited. The shell formation can be detected by using a method such as the above-mentioned TOF-SIMS. The use of the polymer indicated below is not specifically limited provided that shell formation is achieved.

Further, a polymer used in a core-shell preferably has a number average molecular weight of from 500 to 100,000, and specifically preferably from 1,000 to 30,000, in terms of film forming ability after printing, as well as durability thereof and suspension forming ability.

Variety of Tg of the polymer can be used, however, at least one kind of the polymers preferably has a Tg of not lower than 10° C.

In the present invention, every polymer commonly known can be used, however, specifically preferable polymers are polymers containing an acetal group, polymers containing a carboxylic acid ester group, polymers containing a hydroxyl group, and polymers containing an ester group, as a main functional group. The aforementioned polymers may be substituted by substituents, and the substituents may have a straight chain, a branched chain or a cyclic structures. Further, variety of polymers having the functional groups described above are available on the market, however, they can also be synthesized by commonly known methods. The copolymers also can be prepared, for example, by introducing an epoxy group into a polymer molecule followed by condensation polymerization with other polymers or graft polymerization by use of light or radiation.

Polymers containing an acetal group as a main functional group include such as polyvinyl butyral resins. For example, # 2000-L, #3000-1, #3000-2, #3000-4, #3000-K, #4000-1, #4000-2, #5000-A, #6000-C and #6000-EP, manufactured by DENKI KAGAKU KOGYO K. K., or BL-1, BL-1H, BL-2, BL-2H, BL-5, BL-10, BL-S, BL-SH, BX-10, BX-L, BM-1, BM-2, BM-S, BM-3, BM-SH, BH-3, BH-6, BH-5, BY-1, BX-3, BX-5, KS-10, KS-1, KS-3, and KS-5, manufactured by Sekisui Chemical Co., Ltd. are listed.

The resins are obtained as derivatives of PVA (polyvinyl alcohol), and a degree of acetal of hydroxy groups of the original PVA is at most approximately 80 mol %, and generally approximately from 50 mol % to 80 mol %. In case of polyvinyl butyral, 1,1'-butylenedioxy group is formed as an acetal group, however, herein, a degree of acetal does not mean such a narrow definition of acetal but means more general acetal groups, and indicates compounds having acetal group formed from compounds having hydroxyl groups (herein, being polyvinyl alcohol) and compounds having aldehyde groups (herein, being butanal). Further, the content of a hydroxyl group is not specifically limited, however preferably from 10 mole to 40 mol %. The content ratio of an acetyl group is not specifically limited, however, preferably not more than 10 mol %. A Polymer having an acetal group as a main functional group means that at least not less than 30 mol % of oxygen atoms contained in the polymer form an acetal group.

In addition, Iupital series manufactured by Mitsubishi Engineering Plastics Co., Ltd. can also be used as polymers containing an acetal group as a main functional group.

Polymers containing a carboxilic acid ester group as a main functional group include polycarbonate resins. For example, Iupilon series and NOVAREX series manufactured by Mitsubishi Engineering Plastics Co., Ltd. are listed. Iupilon series is prepared from bisphenol A as a starting material, and those having variety of molecular weights can be used, although the value varies depending on measuring methods. In NOVAREX series, those having a molecular weight of from 20,000 to 30,000 and a glass transition temperature of approximately 150° C. can be used, however, they are not limited to these.

A Polymer containing a carboxylic acid ester group as a main functional group means that at least not less than 30 mol % of oxygen atoms contained in the polymer are contributing to form a carboxylic acid ester group.

Polymers containing a hydroxyl group as a main functional group include, for example, PVA. Most of PVA are small in their solubility to an organic solvent, however, the solubility to an organic solvent is increased provided that the saponification value is small. PVA having high water solubility may be added into a water phase and can also be used so as to be adsorbed to a polymer suspension after organic solvents having been removed.

As PVA, those available on the market can be used, and for example, in addition to Poval PVA-102, PVA-117, PVA-CSA, PVA-617 and PVA-505 manufactured by KURARAY Co., Ltd., brand PVA for a sizing agent of specific brand, PVA for thermal fusion molding, and other functional polymers such as KL-506, C-118, R-1130, M-205, MP-203, HL-12E and SK-5102 can be used.

The saponification degree is generally not less than 50 mol %, however, such as LM-10HD having a saponification degree of approximately 40 mol % can also be used. Polymers other than PVA having a hydroxyl group as a main functional group can be used, and polymers in which at least 20 mol % of oxygen atoms contained in the polymer form a hydroxyl group can be used.

Polymers containing an ester group as a main functional group include, for example, methacrylic resins. Such as 560F, 60N, 80-N, LP-1, SR8500 and SR6500 of Delpet series manufactured by ASAHI CHEMICAL INDUSTRIAL Co., Ltd. can be used. A polymer containing an ester group as a main functional group means that at least not less than 30 mol % of oxygen atoms contained in the polymer form an ester group. These polymers may be used each alone or in combinations of two or more kinds. Further, provided that not less than 50 mol % of these polymer is contained, other polymers or inorganic fillers may also be included.

Copolymers of these polymers also preferably used, and, for example, as a method to copolymerize a polymer containing a hydroxyl group and various kinds of polymers, they can be prepared by a hydroxyl group being reacted with a monomer having an epoxy group such as glycidyl methacrylate followed by copolymerization with a methacrylic acid ester monomer by suspension polymerization.

Colorants which are sealed by the aforementioned polymers will be explained. Colorants which can be sealed by the aforementioned polymers can be used without specific limitation, and include, for example, such as oil dyes, disperse dyes, direct dyes, acid dyes and basic dyes. Oil dyes and dispersion dyes are preferably used in terms of superior sealing property. Specifically preferable examples are shown below, however the invention is not limited thereto. Specifically preferable examples include such as C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9. On the other hand, aforementioned oleophilic dyes are not limited by the following, however, specifically preferable examples include as follows.

Orient Chemical Industries, Ltd: Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N Oil Black BY Oil Black BS, Oil Black 860, Oil Black 5970, Oil Black 5906, Oil Black 5905; NIPPON KAYAKU CO., LTD: Kayaset Yellow SF-G Kayaset, Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, Kayaset Blue K-FL; ARIMOTO CHEMICAL CO., LTD: FS Yellow 1015, FS Magenta 1404, FS Cyan 1522, FS Blue 1504, C.I.Solvent Yellow 88, Solvent Yellow 83, Solvent Yellow 82, Solvent Yellow 79, Solvent Yellow 56, Solvent Yellow 29, Solvent Yellow 19, Solvent Yellow 16, Solvent Yellow 14, Solvent Yellow 04, Solvent Yellow 03, Solvent Yellow 02, Solvent Yellow 01, C.I.Solvent Red 84:1, C.I.Solvent Red 84, C.I.Solvent Red 218, C.I.Solvent Red 132, C.I.Solvent Red 73, C.I.Solvent Red 72, C.I.Solvent Red 51, C.I.Solvent Red 43, C.I.Solvent Red 27, C.I.Solvent Red 24, Solvent Red 18, Solvent Red 01, Solvent Blue 70, Solvent Blue 67, Solvent Blue 44, Solvent Blue 40, Solvent Blue 35, Solvent Blue 11, Solvent Blue 02, Solvent Blue 01, Solvent Black 43, C.I.Solvent Black 70, C.I.Solvent Black 34, C.I.Solvent Black 29, C.I.Solvent Black 27, C.I.Solvent Black 22, C.I.Solvent Black 7, C.I.Solvent Black 3, C.I. Solvent Violet 3, C.I.Solvent Green 3, C.I.Solvent Green 7.

Water-soluble dyes such as listed below can be used as colorants. Water-soluble dyes usable in the present invention include, for example, such as azo dyes, methine dyes, azomethine dyes, xanthene dyes, quinone dyes, phthalocyanine dyes, triphenylmethane dyes and diphenylmethane dyes, and the specific compounds will be shown below. However, the present invention is not limited to these example dyes.

[C.I. Acid Yellow]
1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246

[C.I. Acid Orange]
3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168

[C.I. Acid Red]
1, 6, 8, 9, 13, 18, 27, 35, 37, 52, 54, 57, 73, 82, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415

[C.I. Acid Violet]
17, 19, 21, 42, 43, 47, 48, 49, 54, 66, 78, 90, 97, 102, 109, 126

[C.I. Acid Blue]
1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350

[C.I. Acid Green]
9, 12, 16, 19, 20, 25, 27, 28, 40, 43, 56, 73, 81, 84, 104, 108, 109

[C.I. Acid Brown]
2, 4, 13, 14, 19, 28, 44, 123, 224, 226, 227, 248, 282, 283, 289, 294, 297, 298, 301, 355, 357, 413

[C.I. Acid Black]
1, 2, 3, 24, 26, 31, 50, 52, 58, 60, 63, 107, 109, 112, 119, 132, 140, 155, 172, 187, 188, 194, 207, 222

[C.I. Direct Yellow]
8, 9, 10, 11, 12, 22, 27, 28, 39, 44, 50, 58, 86, 87, 98, 105, 106, 130, 132, 137, 142, 147, 153

[C.I. Direct Orange]
6, 26, 27, 34, 39, 40, 46, 102, 105, 107, 118

[C.I. Direct Red]
2, 4, 9, 23, 24, 31, 54, 62, 69, 79, 80, 81, 83, 84, 89, 95, 212, 224, 225, 226, 227, 239, 242, 243, 254

[C.I. Direct Violet]
9, 35, 51, 66, 94, 95

[C.I.: Direct Blue]
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291

[C.I. Direct Green]
26, 28, 59, 80, 85

[C.I. Direct Brown]
44, 106, 115, 195, 209, 210, 222, 223

[C.I. Direct Black]
17, 19, 22, 32, 51, 62, 108, 112, 113, 117, 118, 132, 146, 154, 159, 169

[C.I. Basic Yellow]
1, 2, 11, 13, 15, 19, 21, 28, 29, 32, 36, 40, 41, 45, 51, 63, 67, 70, 73, 91

[C.I. Basic Orange]
2, 21, 22
[C.I. Basic Red]
1, 2, 12, 13, 14, 15, 18, 23, 24, 27, 29, 35, 36, 39, 46, 51, 52, 69, 70, 73, 82, 109
[C.I. Basic Violet]
1, 3, 7, 10, 11, 15, 16, 21, 27, 39
[C.I. Basic Blue]
1, 3, 7, 9, 21, 22, 26, 41, 45, 47, 52, 54, 65, 69, 75, 77, 92, 100, 105, 117, 124, 129, 147, 151
[C.I. Basic Green]
1, 4
[C.I. Basic Brown]
1
[C.I. Reactive Yellow]
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176
[C.I. Reactive Orange]
1, 4, 5, 7, 11, 12, 13, 15, 16, 20, 30, 35, 56, 64, 67, 69, 70, 72, 74, 82, 84, 86, 87, 91, 92, 93, 95, 107
[C.I. Reactive Red]
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235
[C.I. Reactive Violet]
1, 2, 4, 5, 6, 22, 23, 33, 36, 38
[C.I. Reactive Blue]
2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236
[C.I. Reactive Green]
8, 12, 15, 19, 21
[C.I. Reactive Brown]
2, 7, 9, 10, 11, 17, 18, 19, 21, 23, 31, 37, 43, 46
[C.I. Reactive Black]
5, 8, 13, 14, 31, 34, 39
are listed, and the dyes listed above are described in such as "Dyeing Notebook 21st edition" (published by Shikisensha).

Among these water-soluble dyes, preferable are phthalocyanine dyes. Phthalocyanine dyes include those unsubstituted or having a center element of a metal or a non-metal. Preferable metal is copper, and more preferable is C.I. Direct Blue 199.

Further, pigments which are not soluble in water or in various kinds of organic solvents can also be used. As pigments usable in the present invention, conventional organic and inorganic pigments commonly known can be used. For example, azo pigments such as an azo lake, an insoluble azo pigment, a condensed azo pigment and a chelate azo pigment, polycyclic pigments such as a phthalocyanine pigment, perylene and a perylene pigment, an anthraquinone pigment, a quinacridone pigment, a dioxazine pigment, a thioindigo pigment, an iso-indolinone pigment and a quinophthalone pigment, dye lakes such as a basic dye type lake and an acid dye type lake, organic pigments such as a nitro pigment, a nitroso pigment, aniline black and a daylight phosphorescent pigment, and inorganic pigments such as carbon black are listed.

Specific examples of organic pigments are listed below.

Pigments for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178 and C.I. Pigment Red 222.

Pigments for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94 and C.I. Pigment Yellow 138.

Pigments for green or cyan include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

An average particle diameter of a pigment dispersion used in an ink of the present invention is preferably from 10 to 200 nm, more preferably from 10 to 150 nm, and furthermore preferably 10 to 100 nm. When the particle diameter of a pigment dispersion exceeds 150 nm, caused is deterioration of glossiness with recorded images on a glossy medium or deterioration of transparency with images recorded on a transparent medium. Further, when the particle diameter of a pigment dispersion is less than 10 nm, stability of the pigment dispersion becomes poor easily and storage stability of an ink is easily deteriorated.

A particle diameter of a pigment dispersion can be measured by a particle diameter measuring apparatus available on the market utilizing such as a light scattering method, a electrophoresis method and a laser Doppler method. Further it can also be determined by photographing particle images of at least 100 particles by use of a transmission type electron microscope and statistically analyzing the images by use of an image analyzing software such as Image-Pro (produced by Mediacybernetics Co., Ltd.).

As a colorant, metal complex dyes such as described in JP-A 9-277693, 10-20559 and 10-30061 are also usable. For example, dyes represented by formula (1) and formula (2) described in JP-A 10-20559 can be used.

$$M\text{–}[X^1\text{=}L^1\text{–}(L^2\text{=}L^3)_m\text{Y}^1]_{n1} \qquad \text{Formula (1)}$$

$$M\text{–}[X^3\text{-}N\text{=}N\text{-}Y^3]_{n2} \qquad \text{Formula (2)}$$

In formula (1), $X^1$ represents a group of atoms having a structure capable of forming at least two coordination bonds with a metal ion, $Y^1$ represents an aromatic hydrocarbon ring, a 5-membered or 6-membered heterocyclic ring or $-L^4\text{=}Y^2$, and $Y^2$ represents a nitrogen-containing 5-membered or 6-membered heterocyclic ring. $L^1$ and $L^4$ represent a substituted or unsubstituted methine group. M represents a metal ion and forms at least two coordination bonds with the group of atoms represented by $X^1$. "m" represents 0, an integer of 1, 2 or 3, and n1 represents an integer of 1, 2 or 3. Further, in general formula (2), $X^3$, $Y^3$, M and n2 each represent the same as $X^1$, $Y^1$, M and n1 described above.

Further, the following dyes are listed as specific examples thereof.
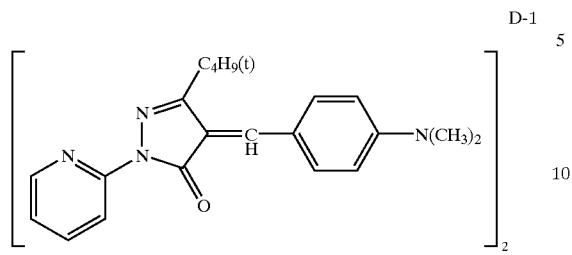
D-1
NiCl₂
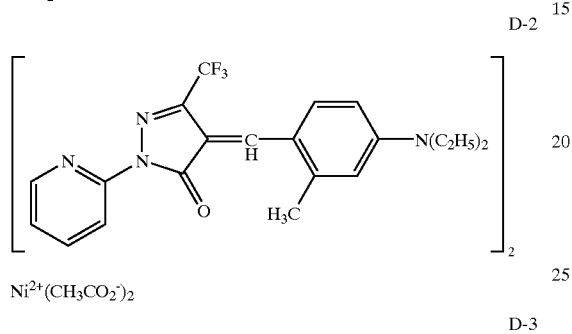
D-2
Ni²⁺(CH₃CO₂⁻)₂
D-3
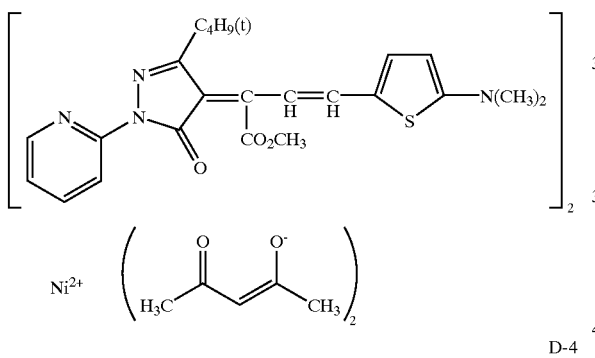
Ni²⁺
D-4
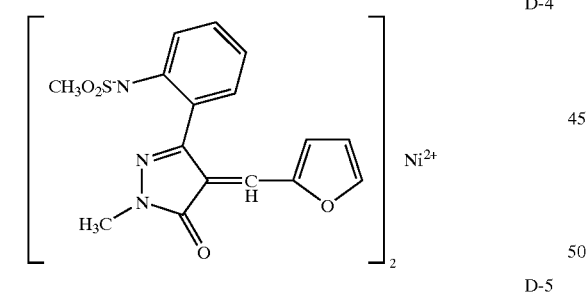
D-5
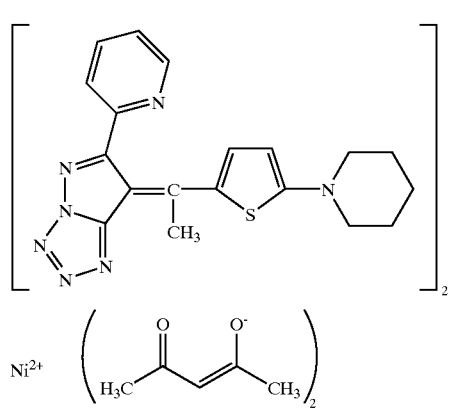
Ni²⁺
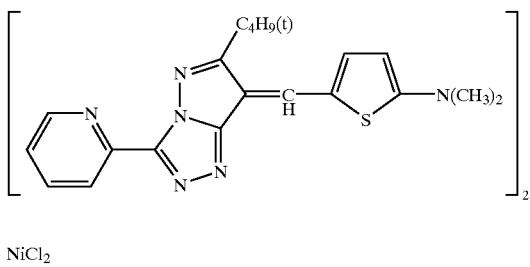
D-6
NiCl₂
D-7
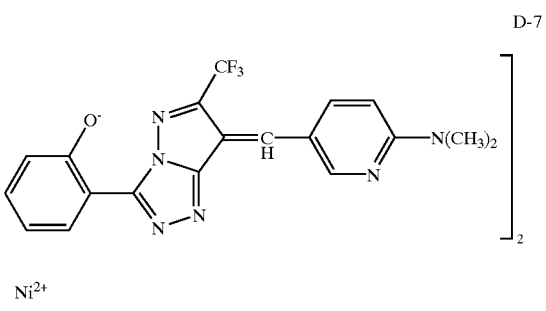
Ni²⁺
D-8
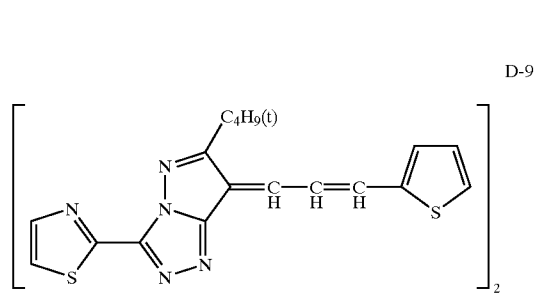
Ni(OH)₂
D-9
Ni(PH₂O₂)₂
D-10

D-11
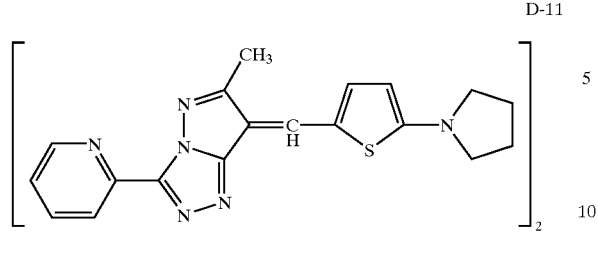
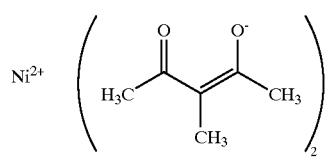
D-12
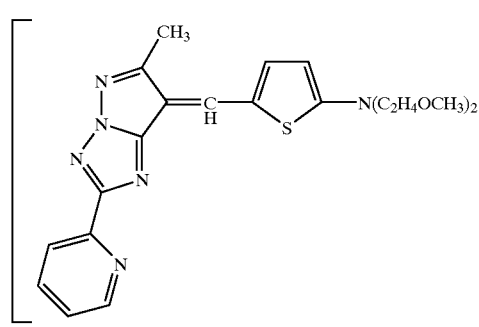
Ni(OH)₂
D-13
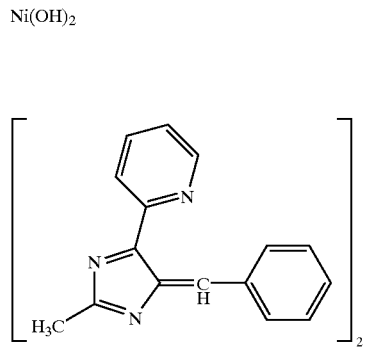   Ni(ClO₄)₂
D-14
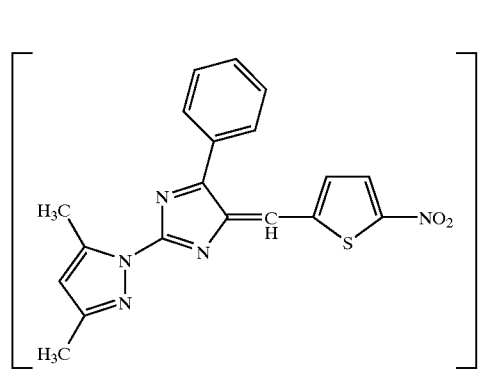   NiCl₂
D-15
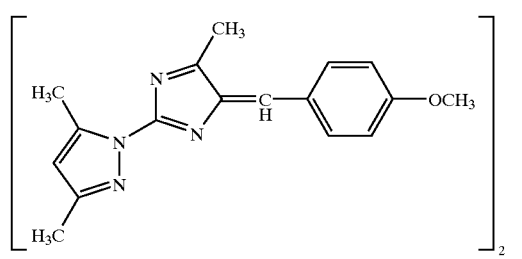
Ni(CH₃COO⁻)₂
D-16
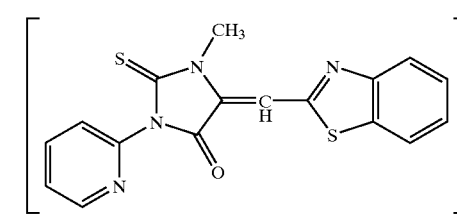
Ni(C₆H₅COO⁻)₂
D-17
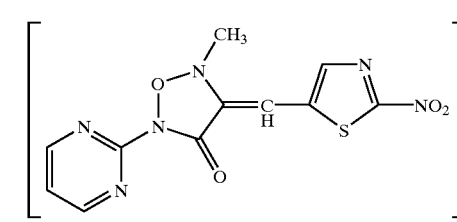
Ni(C₆H₅COO⁻)₂
D-18
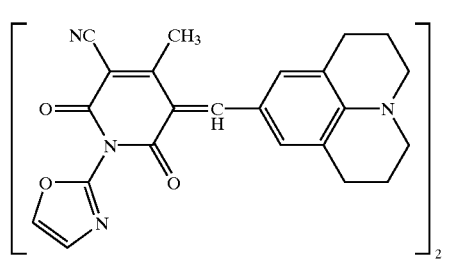   NiCl₂
D-19
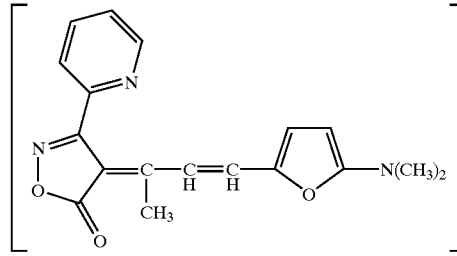
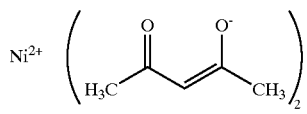

-continued
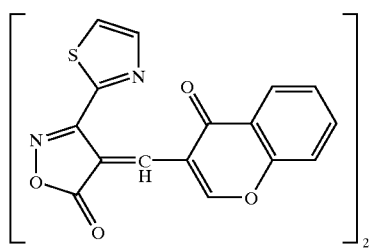
D-20
Ni(ClO$_4$)$_2$
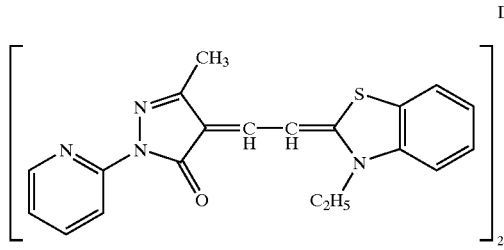
D-21
NiCl$_2$
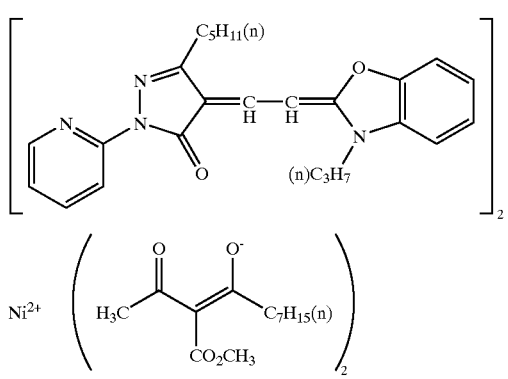
D-22
Ni$^{2+}$
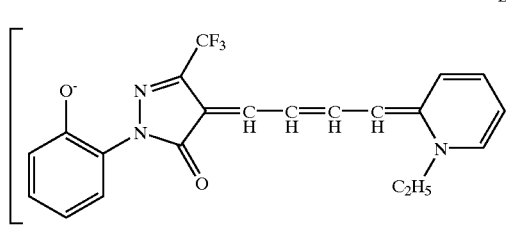
D-23
Ni$^{2+}$
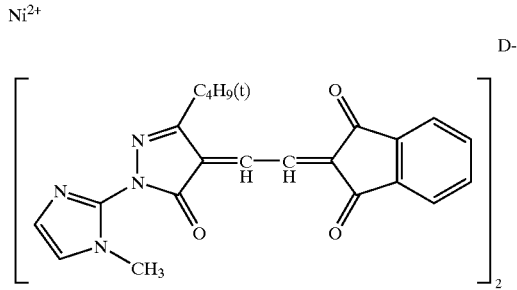
D-24
Ni(ClO$_4$)$_2$
-continued
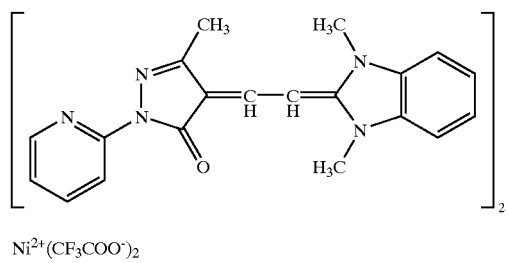
D-25
Ni$^{2+}$(CF$_3$COO$^-$)$_2$
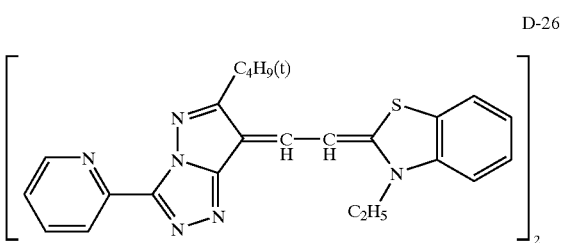
D-26
Ni$^{2+}$
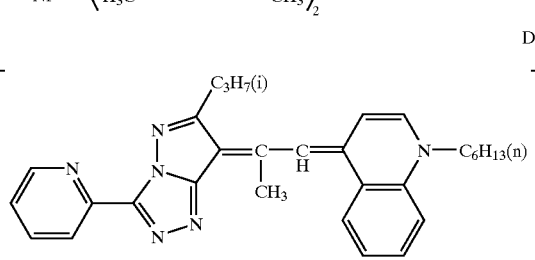
D-27
NiCl$_2$
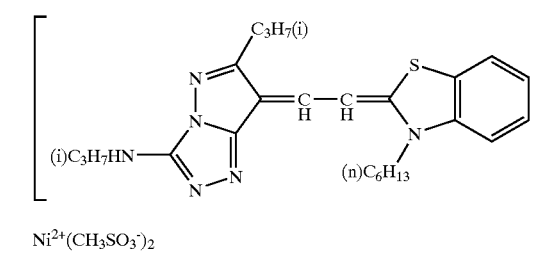
D-28
Ni$^{2+}$(CH$_3$SO$_3^-$)$_2$
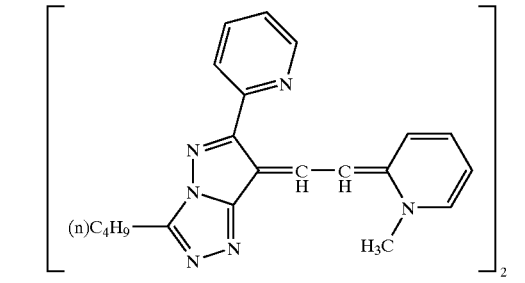
D-29
Zn(ClO$_4$)$_2$ D-30
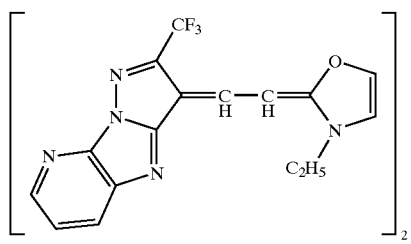
Ni{B(C6H5)}
D-31
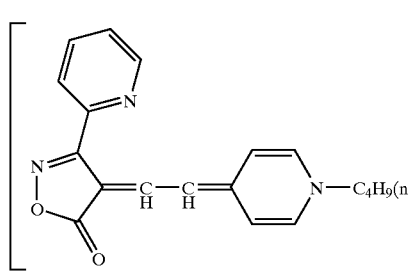
Ni(OH)2
D-32
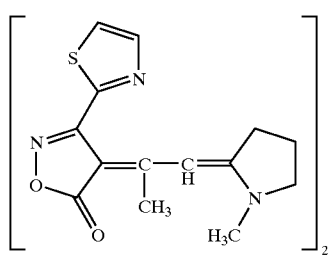
Ni²⁺(CH₃COO⁻)₂
D-33
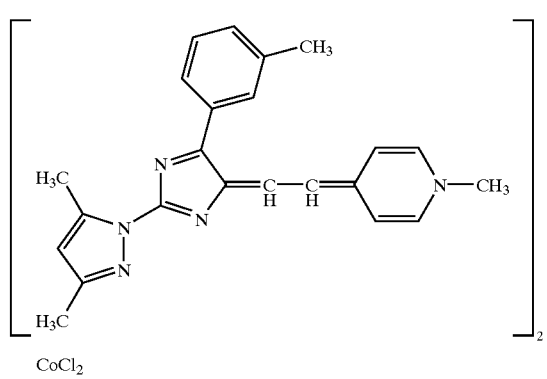
CoCl2
D-34
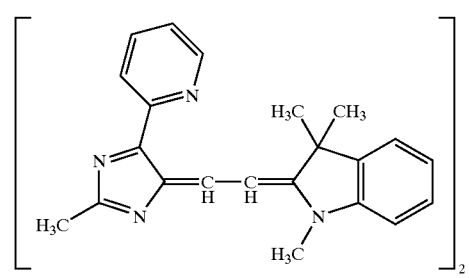
Ni²⁺(C6H5SO3⁻)2
D-35
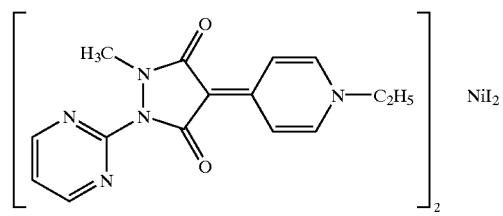
NiI2
D-36
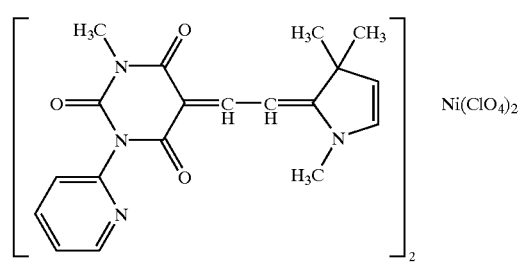
Ni(ClO4)2
D-37
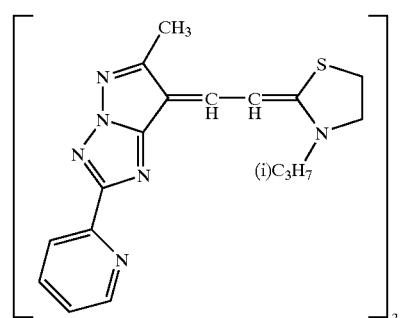
NiCO3
D-38
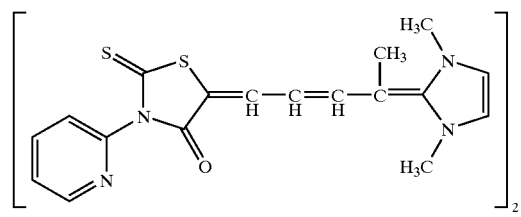
NiCl2
D-39
NiBr2

D-40
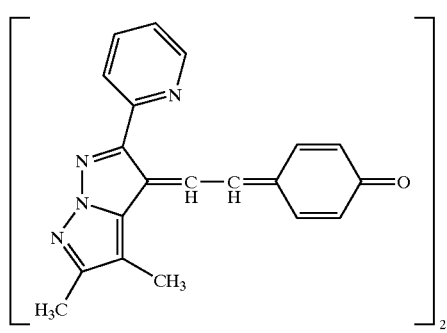
D-41
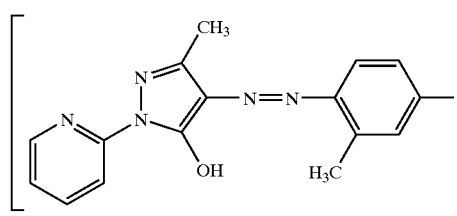
D-42
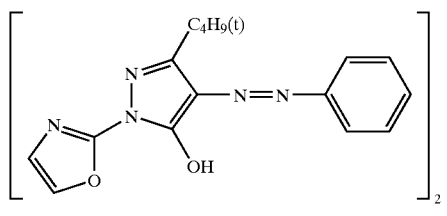
D-43
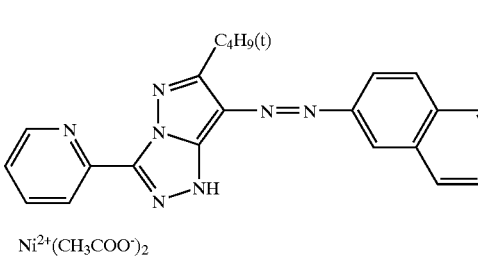
D-44
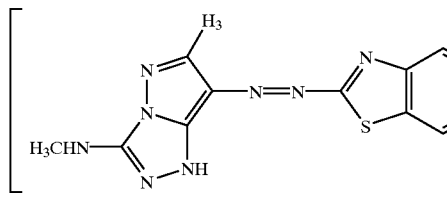
D-45
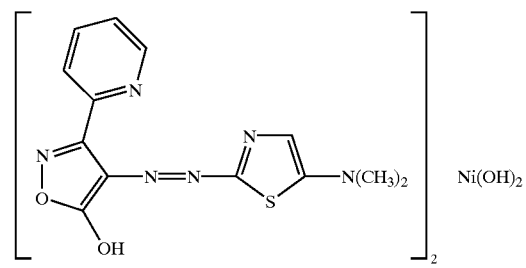
D-46
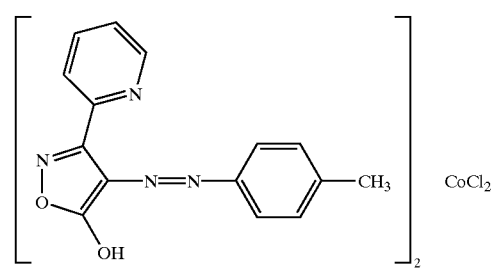
D-47
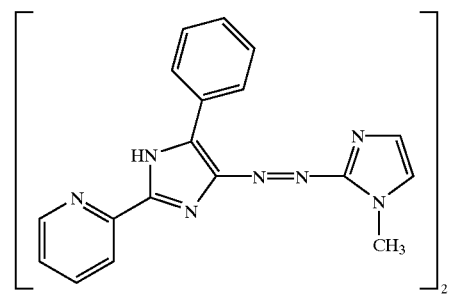
D-48
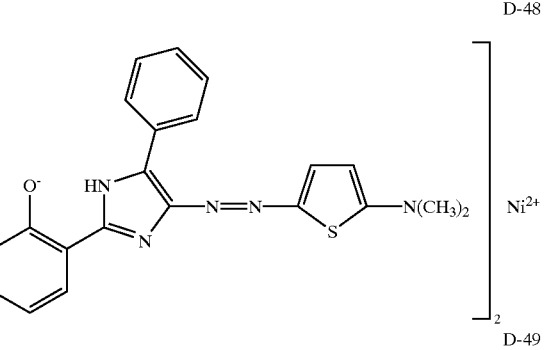
D-49
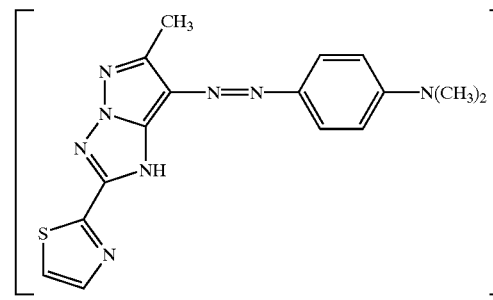

D-50
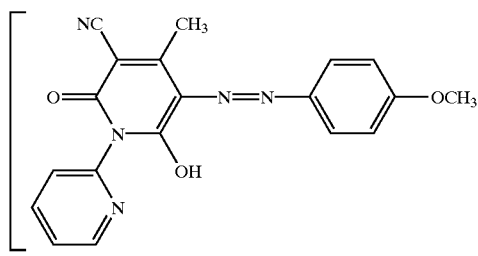
NiCl₂
D-51
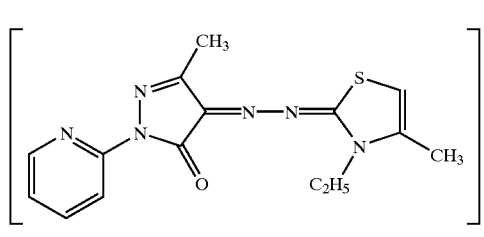
Ni(ClO₄)₂
D-52
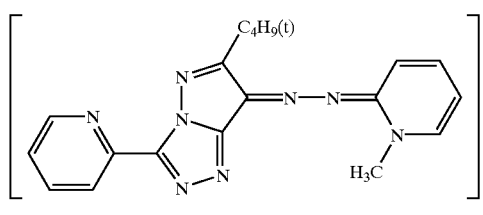    NiCl₂
D-53
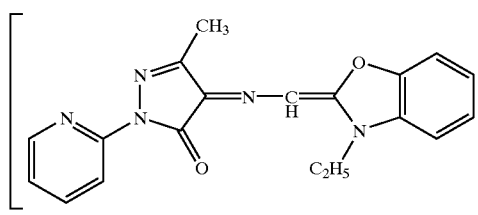
Ni(OH)₂
D-54
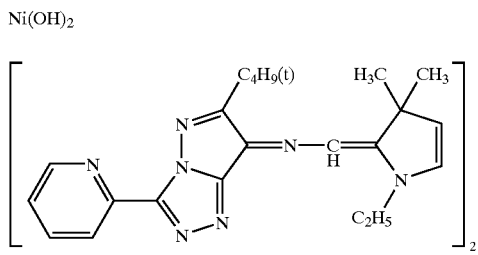
Zn²⁺(CH₃COO⁻)₂
D-55
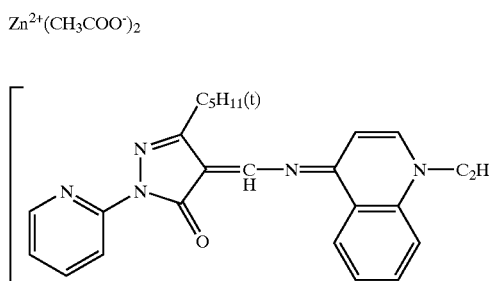
NiCl₂
D-56
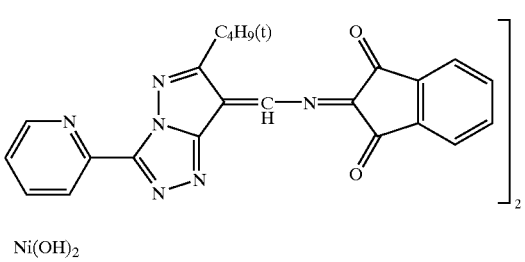
Ni(OH)₂
D-57
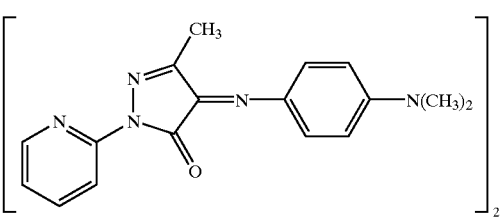
Ni(ClO₄)₂
D-58
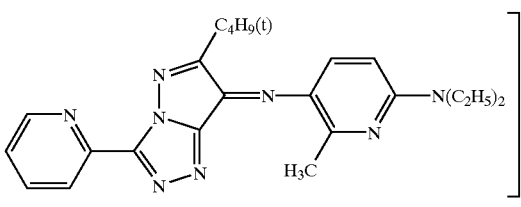
D-59
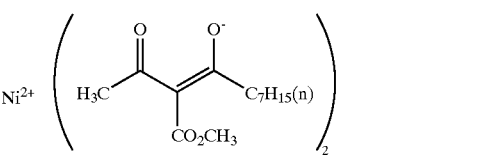    Ni(BF₄)₂
D-60
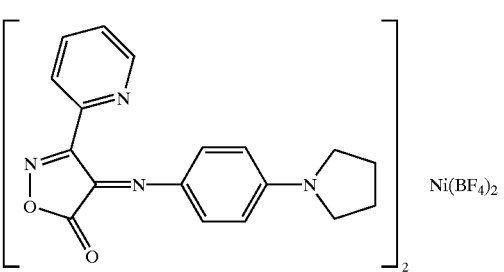
Ni²⁺(p—CH₃—C₆H₄SO₃⁻)₂

D-61
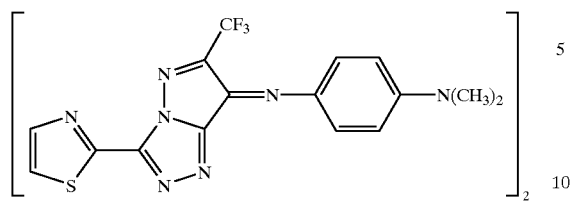
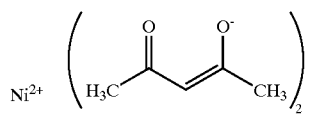
D-62
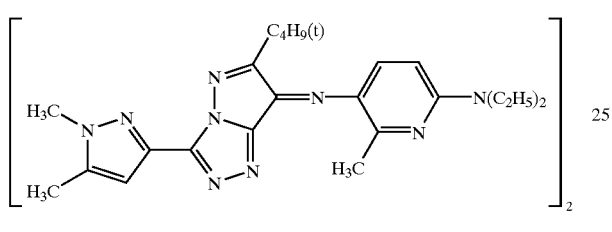
D-63
D-64
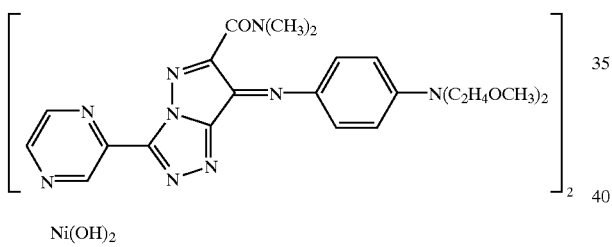
D-65
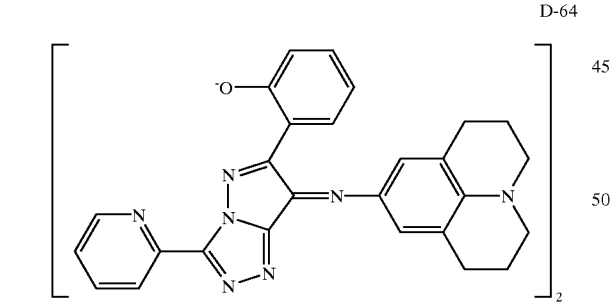
D-66
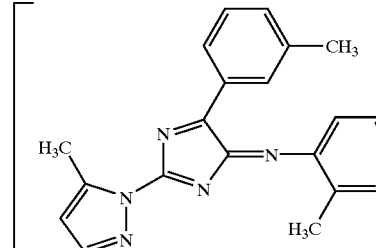
D-67
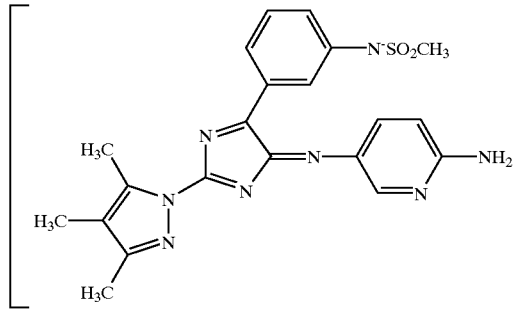
D-68
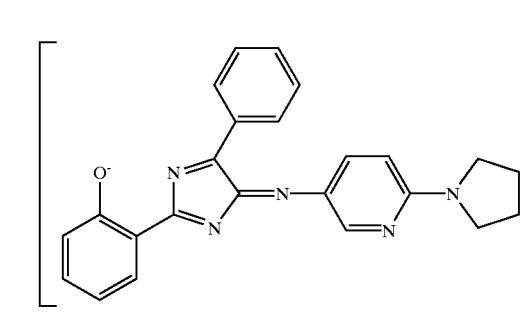
D-69
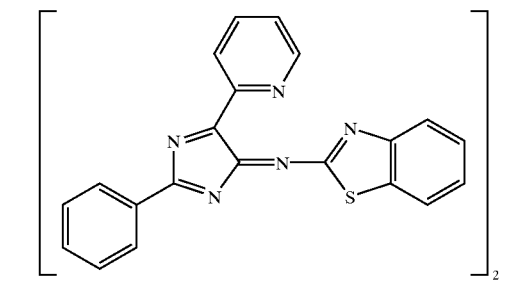
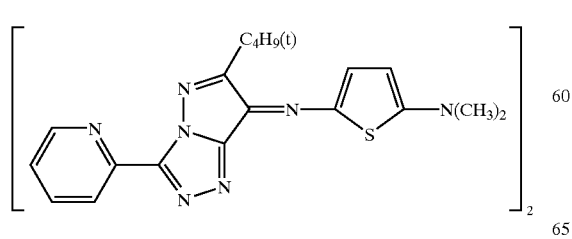
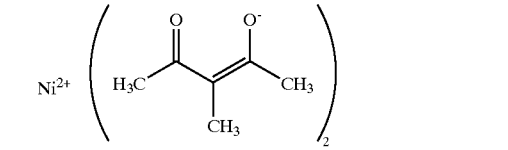

-continued

D-70

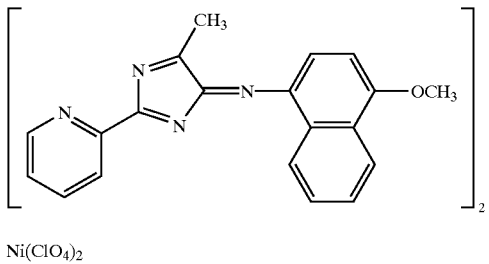

Ni(ClO$_4$)$_2$

In colorant-containing fine particles having a core/shell form of the present invention, a polymer is preferably blended at a amount of from 0.5 to 50 weight % in a polymer emulsion type water-based ink of the present invention, and more preferably at a amount from 0.5 to 30 weight %. When the foregoing blending amount of a polymer is less than 0.5 weight %, a function to protect a colorant is insufficient, on the other hand, when the foregoing blending amount of a polymer is over 50 weight %, storage stability of the suspension as an ink may be decreased or clogging of a printer head may occur due to viscosity increase of the ink or coagulation of the suspension accompanied with ink evaporation at the top portion of a nozzle. Therefore the foregoing range of a blend amount is preferred.

The colorant is preferably blended at 1 to 30 weight % in the ink, and more preferably at 1.5 to 25 weight %. When the blend amount of a colorant is less than 1 weight % print density is insufficient, and when it is over 30 weight % aging stability is lowered tending to increase the particle diameter by such as coagulation. Therefore, the foregoing range is preferred.

An ink of the present invention, utilizing water as a medium, is comprised of a polymer suspension sealing the foregoing colorant, and various kinds of conventional additives well known in the art, for example, a wetting agent such as polyalcohols, a dispersant, a defoaming agent such as a silicone type, an anti-mold agent such as chloromethyl phenol, and/or a chelating agent such as EDTA, or an oxygen absorbing agent such as a sulfite salt type may be contained in the suspension.

As the foregoing wetting agent, for example, polyalcols such as ethylene glycol, propylene glycol, diethylene glycol, triethylene glycol, tetraethylene glycol, polyethylene glycol, glycerin, diethylene glycol diethylether, diethylene glycol mono-n-butylether, ethylene glycol monomethylether, ethylene glycol monoethylether, ethylene glycol monobutylether, methylcarbitol, ethylcarbitol, butylcarbitol, ethylcarbitol acetate, diethylcarbitol, triethylene glycol monomethylether, triethylene glycol monoethylether and propylene glycol monomethylether; ethers thereof, acetate series, nitrogen containing compounds such as N-mehtyl-2-pyrolidone, 1,3-dimethylimidazolidine, triethanolamine, formaldehyde, dimethylformaldehyde; and dimethylsulfoxide can be used alone or in combinations of two or more kinds. These wetting agents are not specifically limited with respect to a blending amount, and can be preferably blended at 0.1 to 30 weight % in the foregoing ink, more preferably at 0.1 to 30 weight %.

Further the foregoing dispersant is not limited specifically, however, a HLB value thereof is preferably from 8 to 18 in terms of exhibiting an effect as a dispersant and being effective to depress the increase of a particle diameter in a suspension.

As a dispersant also are usable commercial products. Such commercial products include, for example, Dispersant SNB, MS, N, SSL, ST and P (name of products) manufactured by Kao Corp.

A blend amount of a dispersant is not limited specifically, however, it is preferably from 0.01 to 10 weight % in an ink of the present invention. When a blend amount of the compound is less than 0.01 weight %, it is difficult to make the particle diameter of a suspension small; when it is over 10 weight %, the particle diameter of a suspension may increase or stability of a suspension may be lowered causing a suspension possibly being gelled. Therefore, preferred is the foregoing range.

Further, as the foregoing defoaming agent, there is no specific limitation and commercially available products can be used. Such commercially available products include, for example, KF 96, 66, 69, KS 68, 604, 607A, 602, 603, KM73, 73A, 73E, 72, 72A, 72C, 72F, 82F, 70, 71, 75, 80, 83A, 85, 89, 90, 68-1F and 68-2F (name of products) manufactured by Shin-Etsu Silicone Co., Ltd. The blend amount of these compounds is not specifically limited, however, is preferably from 0.001 to 2 weight % in a polymer emulsion type water-based ink of the present invention. When a blend amount of the compound is less than 0.001 weight %, it is easy to cause foaming at the time of ink preparation and difficult to eliminate small bubbles in an ink, while when it is over 2 weight %, foaming is restrained but print quality may be deteriorated by generation of repellency spots. Therefore, the foregoing range is preferred.

Next, a preparation method of an ink of the present invention will be explained. An ink of the present invention can be prepared by various kinds of emulsifying methods. The examples are summarized, for example, in p.86 of "Progress and Application of Functional Emulsifiers and Emulsifying Techniques" published by C. M. C. In the invention, specifically preferably used are emulsifying dispersion apparatuses utilizing ultrasonic waves, high speed rotational shear or high pressure.

In emulsifying dispersion by means of ultrasonic waves, can be used are two types, so-called a batch type and a continuous type. A batch type is suitable for preparation of a relatively small amount of samples and a continuous type for preparation of a large amount of samples. In a continuous type, for example, an apparatus such as UH-600SR (produced by S. M. T Co., Ltd.) can be used. In case of such a continuous type, the irradiation time of ultrasonic waves can be determined by (volume of dispersion room)/(flow speed x circulation number). When plural ultrasonic wave irradiation apparatuses are present, it can be determined by totaling each irradiation time. The irradiation time is practically not longer than 10,000 seconds. Further, if more than 10,000 seconds are required, load to the process is too large and emulsifying dispersion time has to be shortened in practice by such as reselecting emulsifiers. For this reason, more than 10,000 seconds is not required. It is more preferably not less than 10 seconds and not more than 2,000 seconds.

As an emulsifying dispersion apparatus by means of high speed rotational shear, dispermixers such as described in pages 255 and 256 of "Progress and Application of Functional Emulsifiers and Emulsifying Techniques" published by C. M. C., homomixers such as described in the page 251 and ultra-mixers such as described in the page 256 can be used. These types of apparatuses can be selectively employed depending on viscosity of a solution at emulsifying dispersion. In the emulsifying dispersion apparatuses by means of high speed rotational shear, the rotational number of stirring fans is important. In case of an apparatus having a stator, since the clearance between a stirring fan and a stator is generally approximately 0.5 mm and can not be made extremely narrow, the shear stress is mainly dependent on a circumferential speed of a stirring fan. Those having a circumferential speed of not lower than 5 m/sec and not higher than 150 m/sec can be applicable in emulsifying dispersion of the present invention. When the circumferential speed is too slow, the particle diameter often cannot be made sufficiently small even with prolonged emulsification time, while the motor ability has to be extremely strengthened to achieve 150 m/sec. Furthermore preferable is from 20 to 100 m/sec.

In emulsifying dispersion by means of high pressure, such as LAB2000 (produced by S.M. T. Co.) can be used, and the emulsifying dispersion ability is dependent on a pressure applied to a sample. The pressure is preferably in a range of from $10^4$ kPa to $5\times10^5$ kPa. Further, aimed particle diameter can be obtained, if necessary, by repeating emulsifying dispersion a few times. When the pressure is too low an aimed particle diameter often cannot be obtained, while it is not practical to increase the pressure to $5\times10^5$ kPa because of excess load to an apparatus. More preferable is a range of from $5\times10^4$ kPa to $2\times10^5$ kPa.

These emulsifying dispersion apparatus can be utilized alone, as well as in combinations if necessary. A colloidal mill or a flow-jet mixer alone cannot achieve the object of the present invention, however, the combination with an apparatus of the present invention can enhance the effect of the present invention by such as enabling emulsifying dispersion in a short time.

An ink of the present invention can also be prepared by so-called phase inversion emulsification, other than using the foregoing apparatus. Herein phase inversion emulsification comprises dissolving the foregoing polymer together with dyes in organic solvents such as esters or ketones, ionizing carboxyl groups in the polymer by addition of neutralizers when necessary, followed by addition of a water phase, and being phase inversed into a water phase by distilling out of the organic solvents. After completing phase inversion, the solvents of ester and ketone types described above together with a certain amount of water are removed by heating the system under reduced pressure to obtain a water-based ink for ink-jet recording of the present invention having a desired concentration.

A polymer emulsion type water-based ink of the present invention can be utilized, for example, as an ink for general writing tools such as a fountain pen, a ball-point pen, a felt pen, other than as an ink for ink-jet recording. A suspension of the present invention can be dried to obtain powder of fine particles.

EXAMPLES

Next, the present invention will further be detailed based on examples. However, the invention is naturally not limited to these examples.

Example 1

Polyvinylbutyral (BL-S manufactured by Sekisui Chemical Co., Ltd., average polymerization degree:350) of 15g and 5 g of Joncryl 67 (manufactured by Johnson Polymer Co.) as a polymer; 10 g of a chelate dye (example compound D-5) as a colorant; and 150 g of ethyl acetate were charged in a separable flask, and after the inside of the flask being substituted by nitrogen, the foregoing polymers and colorant were completely dissolved by stirring. Successively, further, after added dropwise and stirred was 150 g of a solution which contains a necessary amount to neutralize Joncryl 67 of sodium hydroxide and 3 g of sodium lauryl sulfate, the solution was emulsified by use of a ultra-sonic dispersing apparatus (UH-150 type, produced by S. M. T. Co., Ltd.) for 300 seconds. Thereafter, ethyl acetate was removed under reduced pressure to obtain a polymer emulsion impregnated with a dye.

Comparative Example 1

Operations similar to those in Example 1 were performed, except that Joncryl 67 and sodium hydroxide of an amount necessary for the neutralization were eliminated.

Example 2

Operations similar to those in Example 1 were performed, except that Joncryl 67 was eliminated, 3 g of a polyvinyl alcohol resin (MP-203, manufactured by KURARAY Co., Ltd.) was added to the water phase instead of sodium hydroxide and CF Blue HNG (manufactured by Daiwa Kasei Co., Ltd.) was used instead of a chelate dye (example compound D-5), to obtain a polymer emulsion. (Shell polymer: MP-203, 16.7%)

Comparative Example 2

Operations similar to those in Example 2 were performed, except that a polyvinyl alcohol resin was eliminated.

Example 3

Operations similar to those in Example 1 were performed, except that only BL-S was used as a polymer and only sodium lauryl sulfate of 3 g was added in the water phase. Thereafter, after adding 0.1 g of sodium persulfate, polymerization was performed under the flow of nitrogen gas at 80° C. while adding dropwise a mixture of 2.5 g of styrene and 2.5 g of 2-hydroxyethyl mehtacrylate in 2 hours. (Shell polymer: styrene/2-hydroxyethyl methacrylate copolymer, 25%)

Example 4

A sample in Example 3, in which the amounts of styrene and 2-hydroxyethyl methacrylate were increased 1.5 times respectively, was prepared.

Example 5

A sample in Example 3 in which 2 times amounts respectively of styrene and 2-hydroxyethyl methacrylate were used was prepared.

Comparative Example 3

Sodium persulfate, styrene and 2-hydroxyethyl mehtacrylate were eliminated in Example 3.

Comparative Example 4

The amount of styrene and 2-hydroxyethyl methacrylate was reduced to be 1/10 of those used in Example 3. Each amount of other ingredients was the same as in Example 3.

Example 6

The amount of styrene was changed to be 6 g, and the amount of 2-hydroxyethyl methacrylate was changed to be 4 g. Each amount of other ingredients was the same as in Example 3.

Comparative Example 5

The amount of styrene was changed to be 2.5 g and the amount of 2-hydroxyethyl methacrylate was changed to be 7.5 g. Each amount of other ingredients was the same as in Example 3.

A volume average particle diameter and a variation coefficient thereof with respect to colorant containing particles thus prepared are shown in Table 1. Further, the dye concentration ratio of a core to a shell was calculated by the following method to show that all the dye concentration ratios of shells of particles of Examples 1, 2 and 3 were 0.7 based on those of cores. The value was 0.3 for the particle of Example 4, and 0.1 for the particle of Example 5.

TABLE 1

|  | Volume average diameter (1) | Variation coefficient (2) | Core-shell formation (3) | Core/shell | St/HEMA ratio (weight) | Colorant concentration ratio (4) | Shell/Core Ratio (Wt %) | Remark |
|---|---|---|---|---|---|---|---|---|
| Example 1 | 90 nm | 30% | Yes | BL-S/JONCRYl |  | 0.7 | 25% |  |
| Comperative Example 1 | 80 nm | 30% | No |  |  |  |  |  |
| Example 2 | 150 nm | 50% | Yes | BL-S/MP-203 |  | 0.7 | 16.6% |  |
| Comparative Example 2 | 350 nm | 90% | No |  |  |  |  | Observed Coagulation |
| Example 3 | 100 nm | 30% | Yes | BL-S/St-HEMA | 1/1 | 0.7 | 25% |  |
| Example 4 | 116 nm | 32% | Yes | BL-S/St-HEMA | 1/1 | 0.3 | 33% |  |
| Example 5 | 125 nm | 34% | Yes | BL-S/St-HEMA | 1/1 | 0.1 | 40% |  |
| Comparative Example 3 | 90 nm | 20% | No |  |  |  |  |  |
| Comparative Example 4 | 100 nm | 30% | Yes | BL-S/St-HEMA | 1/1 | 0.9 | 2.5% |  |
| Example 6 | 110 nm | 20% | Yes | BL-S/St-HEMA | 3/2 | 0.2 | 40% |  |
| Comparative Example 5 | 140 nm | 90% | Yes | BL-S/St-HEMA | 1/3 | 0.5 | 40% |  |

St; Styrene HEMA; Hydroxyethyl methacrylate
(1) A volume average particle diameter was measured by use of a laser particle diameter analyzing system, produced by Otsuka Denshi Co.
(2) An equivalent circle particle diameter obtained from a projected areas of TEM photographs was converted to an equivalent spherical diameter, to determine a volume average particle diameter and a standard deviation thereof, and which was divided by a volume average particle diameter to calculate a variation coefficient.
(3) Core-shell formation was confirmed by dyeing an ultra-thin slice of a suspension with $RuO_4$ after being fixed on a mesh attached with a carbon support film, and comparing the degree of dyeing with comparative samples respectively.
(4) The colorant containing ratio (concentration) in a core/shell was calculated as follows.

Colorant-containing particles prepared were coated and dried on a Si-wafer, an area strength at a mass number of a dye as a colorant+1 was divided by a strength of total ions detected in a range from 0.5 to 1000 a. m. u., under the following conditions, and colorant containing ratio (concentration) was calculated by comparing the value with respect to, a particle comprised of only a core, and a core/shell particle, respectively.

Name of Apparatus; TRIFT-II
Producer; Physical Electronics Co., Ltd.
Primary Ion; $Ga^+$
Acceleration Voltage; 15 kV
Measurement Range of Mass Number; 0.5 to 1000 a. m. u.
Measurement Area; 60 μm×60 μm
Detected Ion; normal secondary ion detection
Time of Accumulation; 5 minutes
Measurement Temperature; cooled by liquid nitrogen
Stage Voltage; 3000 V Consecutively, the polymer emulsion of colorant containing particles prepared above was mixed with the following components, the obtained dispersion was filtered through a 5-micron filter to eliminate dusts and coarse particles to prepare an ink-jet ink.

| | |
|---|---|
| Polymer emulsion prepared in Examples 1 to 6 and Comparative Examples 1 to 5 | 80 g |
| Diethylene glycol | 10 g |
| Glycerin | 9.8 g |
| Acethylenol EL | 0.20 g |

By using an ink thus prepared, printing was performed on Photo-Jet Paper Photolike QP glossy paper (manufactured by Konica Corp.) with Ink-jet Printer PM-800 (produced by Epson Co., Ltd.) available on the market. The results are shown below.

TABLE 2

|  | Light fastness (1) | Color Tone (2) |
|---|---|---|
| Example 1 | A | B |
| Comparative Example 1 | A | C |
| Example 2 | A | B |
| Comparative Example 2 | C | C |
| Example 3 | A | B |
| Example 4 | A | B |
| Example 5 | A | A |
| Comparative Example 3 | A | C |
| Comparative Example 4 | A | C |

TABLE 2-continued

|  | Light fastness (1) | Color Tone (2) |
|---|---|---|
| Example 6 | A+ | A |
| Comparative Example 5 | A | C |

(1) The light fastness test was performed by use of Low-Temperature Xe Weather-Meter XL75 (produced by Suga Shikenki Co.). Further, the density change was measured by X-Rite 900 (produced by Nippon Heibankizai Co.). After a week test, samples having not less than 60% of the original density were ranked A+ (a superior level), samples having not less than 30% of the original density were ranked A (an acceptable level), and samples having the lower % were ranked C (an unacceptable level)
(2) The color tone was evaluated by X-Rite. At each place of a density of 1.3, whan a* value of magenta was not less than 80, it was ranked as B, not less than 85 as A and less than 80 as C.

Further, when a* and b* values of cyan were not more than −30 respectively, it was ranked as B, and other than this as C.

As detailed above, an ink comprising a water-based suspension which is superior in color reproduction quality and fastness has been obtained.

What is claimed is:

1. A water-base ink for ink-jet printing, comprising a polymer dispersion comprising water and polymer particles having a size of 5 to 500 nm in volume average diameter and having a core-part and a shell-part in each of the polymer particles, wherein the core-part and the shell-part each comprise a colorant and a polymer, the shell-part containing the colorant in an amount of not more than 80 weight % of the colorant in the core-part, and the variation coefficient of the volume diameter of the polymer particles being not more than 80%.

2. The polymer particles of claim 1, wherein the core-part and the shell-part each comprise a colorant and a polymer, and the shell-part contains the colorant in an amount of not more than 50 weight % of the colorant in the core-part.

3. The polymer particles of claim 1, wherein the shell-part in each of the polymer particles contains the polymer in an amount of 5 to 95 weight % of the polymer in each of the polymer particles.

4. The polymer particles of claim 1, wherein each of the polymer particles contains the colorant in an amount of 20 to 1000 weight % of the polymer in each of the polymer particles.

* * * * *